April 28, 1942.  M. G. LEONARD  2,281,073
PROTECTIVE DEVICE FOR ELECTRICAL APPARATUS
Filed Sept. 3, 1938  4 Sheets-Sheet 1
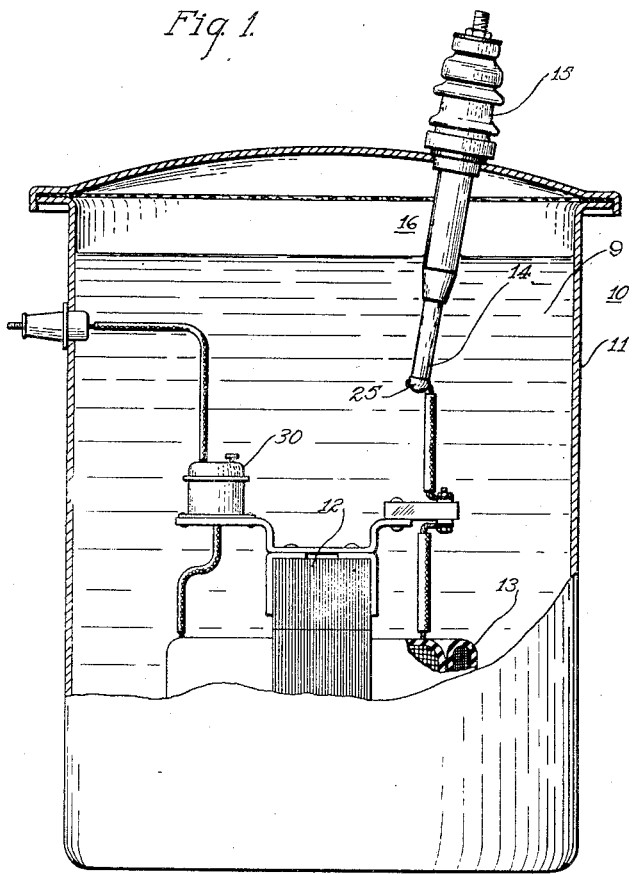
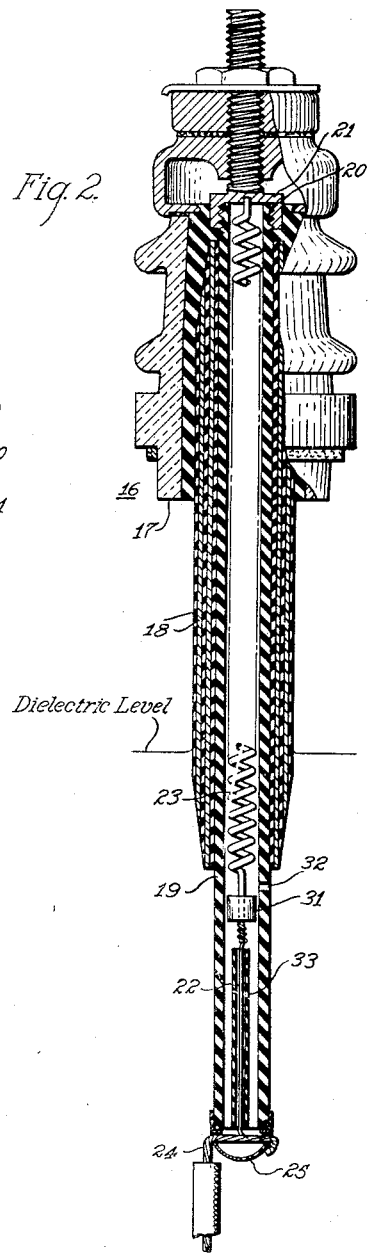
WITNESSES:
E. F. Oberheim
Thru. C. Groome
INVENTOR
Merrill G. Leonard.
BY Ezra W. Savage
ATTORNEY April 28, 1942. M. G. LEONARD 2,281,073
PROTECTIVE DEVICE FOR ELECTRICAL APPARATUS
Filed Sept. 3, 1938 4 Sheets-Sheet 2
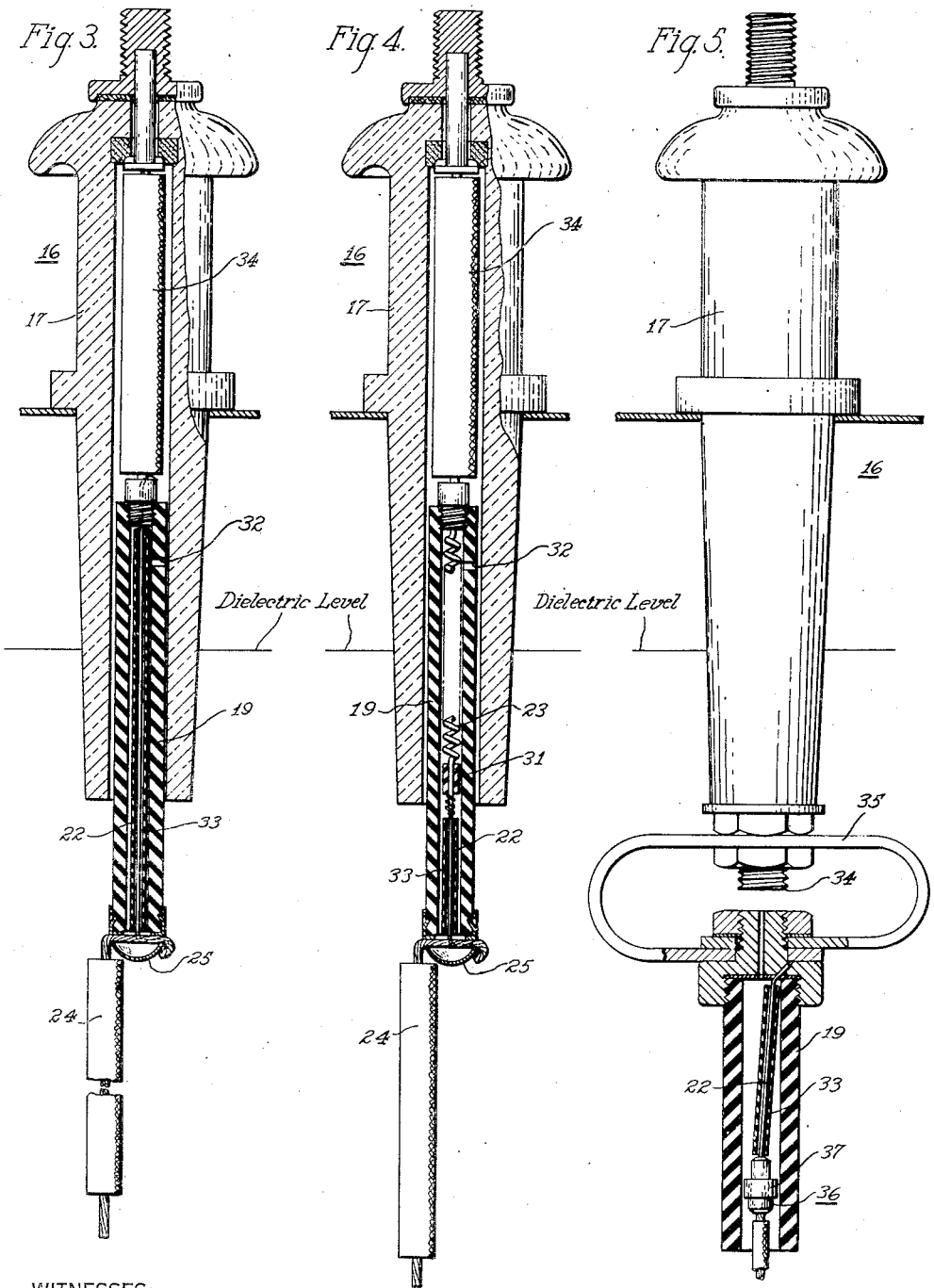
WITNESSES:
INVENTOR
Merrill G. Leonard.
BY
ATTORNEY April 28, 1942.                M. G. LEONARD                2,281,073
                PROTECTIVE DEVICE FOR ELECTRICAL APPARATUS
                    Filed Sept. 3, 1938          4 Sheets-Sheet 3

WITNESSES:

INVENTOR
Merrill G. Leonard
BY
ATTORNEY

Patented Apr. 28, 1942

2,281,073

UNITED STATES PATENT OFFICE 2,281,073

PROTECTIVE DEVICE FOR ELECTRICAL APPARATUS

Merrill G. Leonard, Sharon, Pa., assignor to Westinghouse Electric & Manufacturing Company, East Pittsburgh, Pa., a corporation of Pennsylvania Application September 3, 1938, Serial No. 228,333

13 Claims. (Cl. 200—120)

The invention relates generally to protective devices for electrical apparatus and more particularly to protective apparatus embodying a fusible link.

The object of the invention is to provide for the interruption of an arc resulting from the fusing of a conductor in a manner that will prevent a restriking of the arc.

It is also an object of the invention to utilize the products of decomposition to cooperate in the interruption of the arc and to prevent it from restriking.

The invention, accordingly, is disclosed in the embodiment thereof shown in the accompanying drawings and comprises the features of construction, combination of elements and arrangement of parts which will be exemplified in the construction hereinafter set forth and the scope of the application of which will be indicated in the claims.

Figure 6:
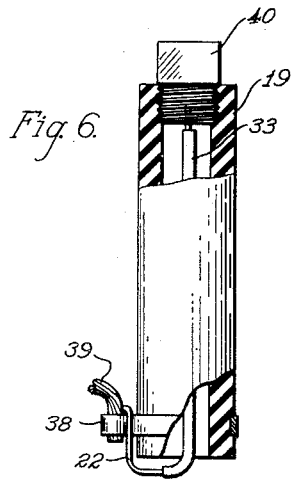
Figure 8:
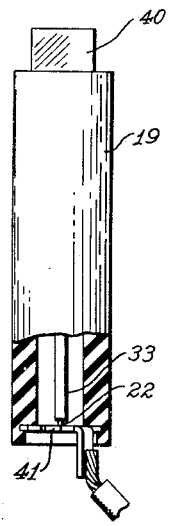
Figure 7:
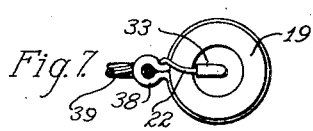
Figure 9:
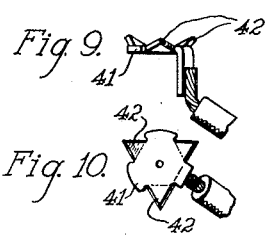
Figure 10:
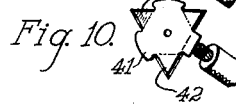
Figure 11:
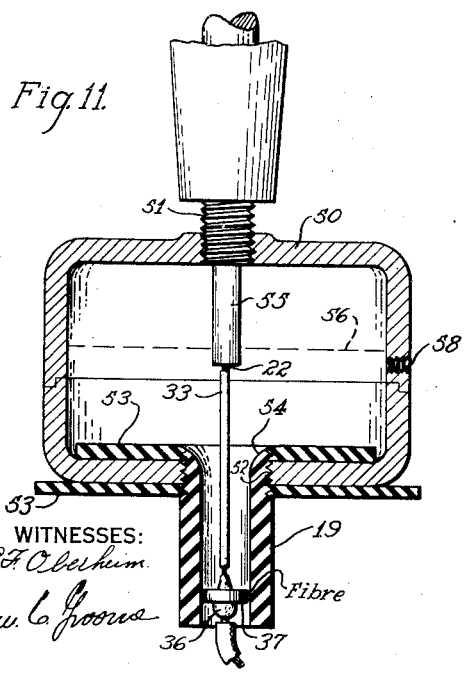
Figure 12:
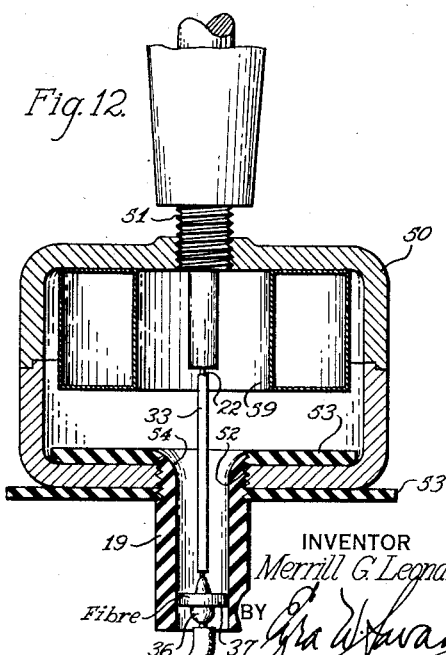
Figure 13:
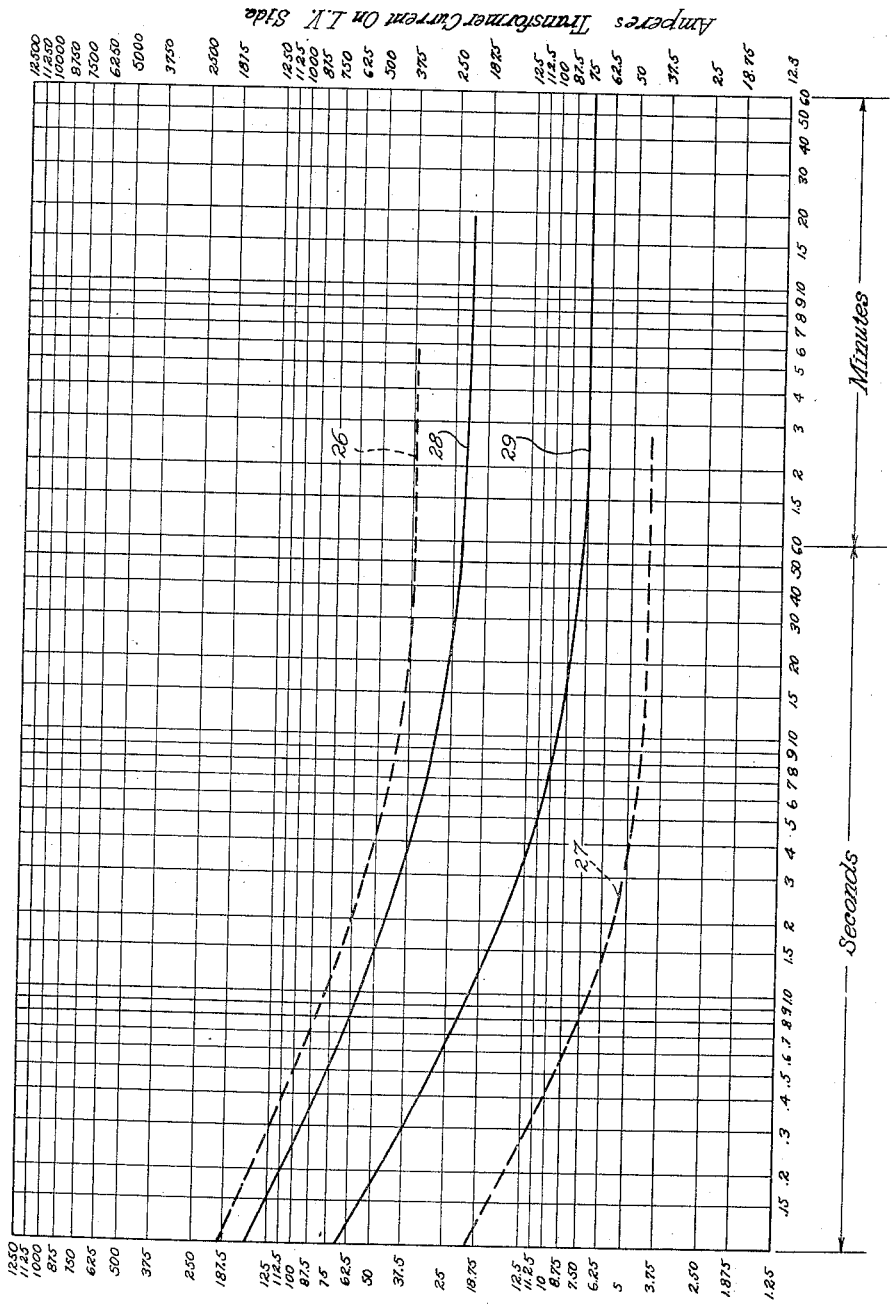

For a fuller understanding of the nature and objects of the invention, reference should be had to the following detailed description taken in connection with the accompanying drawings, in which:

Figure 1 is a view in side elevation of a distribution transformer with a portion of the case cut away to show the invention applied to a transformer, Fig. 2 is a view in vertical section of a protective device constructed in accordance with this invention, Fig. 3 is a view in vertical section of a modification of the protective devices, Fig. 4 is a view in vertical section of another modified form of the invention, Fig. 5 is a view partly in side elevation and partly in section showing an improved mounting of the invention, Fig. 6 is a view partly in side elevation and partly in section of a modification of the invention, Fig. 7 is a view in end elevation of the modification illustrated in Fig. 6, Fig. 8 is a view partly in section and partly in side elevation of a protective device constructed in accordance with the invention showing a specific type of electrode and the manner in which it is mounted, Fig. 9 is a view in side elevation of the electrode before it is mounted, Fig. 10 is a view in top plan of the electrode shown in Fig. 9, Fig. 11 is a view partly in section and partly in side elevation of a protective device having cushioning means for receiving the shocks resulting from the arcing process, Fig. 12 is a view partly in section and partly in side elevation of a modified form of the protective device with a particular type of shock cushioning means, and Fig. 13 is a curve sheet showing the coordination between the protective device of this invention and other protective devices that may be utilized in conjunction with it.

Referring now to the drawings and Fig. 1 in particular, a transformer 10 is illustrated as provided with a case 11, core 12, windings 13 and a protective device 14 constructed in accordance with this invention mounted in an insulator 15. As illustrated the dielectric liquid 9 in the transformer at least partially immerses the protective device 14.

It will readily be appreciated that the protective device may be mounted in many different ways and that the practical embodiments of it illustrated in Figs. 1 to 5, inclusive, are not intended to show all possible methods of mounting. In the manufacture of certain types of apparatus such as transformers, it has been found in some instances satisfactory to mount it in the bushing 15. However, such a mounting is not essential.

Referring to Fig. 2 the bushing shown generally at 16 is of the condenser type having a porcelain shell 17 and alternate layers of condenser plates and insulation 18.

Inside the plates and insulation of the bushing is a longitudinal opening in which a fiber tube 19 is mounted. As illustrated, the fiber tube is threaded on the upper end at 20 to engage any threaded member 21 disposed in the upper end of the bushing. In this embodiment of the invention a fiber tube has been selected since it has many suitable characteristics adapting it to use in the manufacture of such protective devices in accordance with this invention.

In order to provide for interruption of the circuit when an excess current flows, a fusible conductor 22 is provided. This conductor may be made from some suitable material having the desired characteristics, for example, fusing temperature, capacity to resist corrosion when exposed to dielectrics and sufficient mechanical strength. Investigation has revealed that generally a wire sold to the trade under the trade name "Everdur" has the required characteristics. However in many instances copper and other metals may be utilized.

As illustrated, a fusible conductor 22 is disposed in the lower end of the fiber tube 19. This conductor is suspended from the coiled conductor 23 and is anchored at the lower end to the conductor 24 carried by the cap 25.

The cap 25 is mounted on the lower end of the tube 19 by a mechanical connection whereby when the pressure in the tube reaches a predetermined value, the cap is dislodged.

In selecting the fusible conductor 22 for the protective link, attention must be given to the many different operating conditions that will be found in actual practice. In designing the protective link a plurality of curves are prepared for the different sizes of wire and from these curves a selection of the fusible conductor 22 is made which will fit within the curves plotted for the apparatus with which the protective device is to be associated. Having the curves for different sizes of "Everdur" any one skilled in the art may readily pick a conductor that may be coordinated with the other apparatus. In Fig. 13 a set of curves is given which will illustrate how the fusible member may be coordinated with the other electrical apparatus in the system. These curves were plotted for an installation. The curve 27 is the curve for a line fuse at the customer's end of the line. The curve 26 is a curve for the protective equipment provided in the lines supplying the transformer. The curve 28 is plotted for the protective link and is slightly above the curve 29 plotted for a breaker illustrated at 30 in Fig. 1.

In order to get the maximum shock absorbing capacity and increase in arc length in the tube 19 in a short interval of time, a disc 31 is mounted on the lower end of the coiled conductor 23 as best shown in Fig. 2. This disc 31 acts in the manner of a piston when gases are generated as a result of the fusing of the fusible conductor 22 and collapses the coiled conductor 23.

A vent 32 is provided in the fiber tube at a point just above the disc or piston 31 when it stands in its normal position, as illustrated in Fig. 2. This vent 32 facilitates the entry of the dielectric into the tube 19.

The operation of the fusible link 22 can be stabilized by mounting thereon a fiber or any other suitable insulating tube 33. In the embodiment of the invention illustrated in Fig. 2, the tube 33 extends throughout substantially the full length of the conductor 22 and has an inside diameter slightly greater than the external diameter of the fusible conductor. In operation when the temperature of the fusible conductor has reached a point higher than that required for cracking the oil, gases are generated which flow upwardly in the tube driving out all of the dielectric liquid and establishing a definite cooling rate for the conductor. When the dielectric has been forced from the tube, the rise in temperature will have a predetermined ratio to the current flow and it is possible to predetermine exactly the functioning of a particular fusible conductor. Therefore, the use of the tube gives the protective device a constant performance characteristic that may be predetermined to meet given operating conditions.

Assuming now that an excessive current flows, the fusible conductor 22 will rise in temperature at a rate depending on the current flow. When the temperature reaches a value above the cracking or boiling point of the dielectric, gases will be generated which will drive the dielectric out of the tube 33. When the tube is cleared of dielectric, the cooling rate of the conductor will become substantially constant and it will continue to rise in temperature. If the excessive current continues to flow, the temperature will rise to the point where the conductor will fuse. When the fusing occurs and an arc is established, the tube 33 will be ruptured with the result that more of the dielectric will be decomposed and gases generated at a rapid rate. The pressure developed will blow the cap 25 from the tube and project the lower portion of the fused conductor 22 downwardly into the dielectric, thus cooperating in the interruption of the arc and by effecting a separation of the fused portions of the conductor prevent the restriking of the arc. The pressure generated at the lower end of the fiber tube will propel the piston 31 upwardly collapsing the coil conductor 23.

If the current is not great enough to effect a rapid generation of gases the cap 25 may not be dislodged. In such cases turbulence, pressures and deionization processes in the dielectric will result in the interruption of the arc.

When a large current effects the rupture of the fusible conductor 22 and the rapid generation of gases, the cap 25, disclosed in the modification illustrated in Fig. 2 will be blown off the lower end of the tube and cooperate in the interruption of the arc and the separation of the fused parts of the conductor.

During the rupture of the arc the lower electrode or cap 25 moves at a high speed through the dielectric. This movement of the electrode effects a rapid lengthening of the arc. Further in the area following the electrode great turbulence is produced in the dielectric. This turbulent condition cooperates to cool and interrupt the arc stream.

At the lower end of the tube where the cap has been discharged great turbulence and a necking operation occurs as a result of the orifice effect, while within tube 19 high pressures and turbulence are produced.

This combination of conditions will interrupt an arc. When an interruption of the arc occurs there is a rapid build up of dielectric strength because the lower electrode has been moved away interposing a body of fresh dielectric. This movement of the electrode will add an additional factor of safety against the restriking of the arc.

In the modification of the invention illustrated in Fig. 3, the protective device is suspended from the lead 34. It will be noted that no cushioning means is provided in the fiber tube 19 and the lead 34 is relied upon to absorb a portion of the shock resulting from a fusing of the conductor 22.

In the modification illustrated in Fig. 4, the protective device is suspended from lead 34 as in the modification illustrated in Fig. 3. However, in this instance, a piston 31 and coiled conductor 23 is provided for cushioning the shock resulting from a fusing of the conductor 22.

The operation of the modification illustrated in Fig. 4 will be the same as that described for the modification illustrated in Fig. 2.

Many methods may be employed for cushioning the shock resulting from the fusing of the conductor. The mechanical structure illustrated in Fig. 5 which is generally intended for power transformers comprises a U-shaped member suspended from the bushing 16 and electrically connected to the lead 34 extending through the bushing. The U-shaped or loop member 35 will be made of some suitable material well known in the art. A protective device is suspended from the loop member 35, as illustrated.

In this modification of the invention, the fiber tube 19 is suspended from the lower end of the loop member 35. Many methods may be provided for suspending the protective device and in this instance a plurality of lock nut devices are utilized. The lower end of the lock nuts is threaded to receive the threaded end of the tube 19. The fusible link 22 is electrically connected to the lock nut structure which, in turn, is electrically connected to the lower end of the U-shaped member 35. The tube 33 performs the same function as it does in the other modifications of the invention.

However, in this modification of the protective device, no cap is provided but instead a projectile 36 is suspended from the lower end of the fusible conductor 22. This projectile carries a disc 37 which functions in the manner of a piston when subjected to pressure.

In the operation of this protective device when the fusible conductor 22 is blown, the gases generated force the piston 37 downward forcing the projectile or electrode 36 out of the tube into the dielectric therebelow. In this modification the pressure developed in the tube will force the piston 37 of the projectile 36 downwardly at a high speed.

The shock resulting from the fusing of the conductor 22 will be absorbed in the member 35. The strength of the arms of the loop member 35 will depend on the conditions to be met.

In the modification of the invention illustrated in Fig. 6, the fusible conductor 22 is brought down through the open tube 19 and anchored to a bracket 38 provided on the tube. The fusible conductor 22 is connected to the lead 39 at the point where it is anchored to the bracket.

This type of protective device may be mounted in any suitable manner and, as shown, the upper end of the tube 19 is threaded to receive a threaded stud 40 which may be suspended from any suitable bushing or other support. The upper end of the fusible conductor is suspended from the threaded member 40 which serves as the upper electrode.

The tube 33 provided in the modification illustrated in Fig. 6 performs the same function as in the other modifications. However, in this case the tube is made substantially the length of the fusible conductor.

In operation the arc extends from the plug 40 to the bracket 38. Thus an arc is struck which is subjected to turbulence and pressure in the tube 19 to a necking or orifice action at the end of the tube, and to a magnetic blowout action because of its loop motion around the end of the tube. This results in the interruption of the arc.

The modification of the invention illustrated in Fig. 8 is very similar to that illustrated in Fig. 6 with the exception that a cap is provided in the lower end of the tube 19. It will be readily appreciated that this cap or closure 41 may be made in many different ways. In practice it has been found feasible to counterbore the lower end of the tube 19 and press the closure member 41 illustrated in Figs. 9 and 10 into the position illustrated forcing projections 42 into the walls of the tube.

Tests made on this type of protective device reveal that by carefully selecting the gage and quality of the metal, the desired resistance to expulsion from the tube can be obtained. The facility with which such a closure member 41 can be mounted is adapted for production manufacture.

In instances where it is desired to interrupt high current arcs the modification illustrated in Figs. 11 and 12 have been used with success.

In the structure illustrated in Fig. 11, a case 50 is provided which may be suspended from any suitable support such as the threaded member 51. An opening 52 is provided in the lower end of the case and threaded to receive the upper threaded end of the fiber tube 19. In this particular embodiment, insulating plates 53 are provided on opposite sides of the bottom of the case making threaded engagement with the fiber tube 19. The insulating members 53 and the tube 19 may be rounded, as illustrated at 54. A fusible conductor 22 with a tube 33 is provided and electrically connected to the electrode 55 depending from the member 51. A projectile 36 and a fiber disc 37 are suspended from the lower end of the fusible conductor 22.

When the case 50 is immersed in the dielectric, the latter will flow past the projectile 36 and piston 37 and rise to a level such as illustrated at 56. Therefore a volume of air or other gases will be trapped in the container.

Assuming now that the conductor 22 is fused and that gases are generated, the pressure will tend to rise rapidly but will be cushioned by the air or other gases trapped in the case 50. As soon as the conductor is fused, the gas pressure on the piston 37 will force it and the projectile 36 downwardly into the dielectric. The piston 37 will float free and the projectile will continue its downward course depending upon the speed it acquired when it was discharged from the tube 19. The vent 58 will cooperate in releasing pressures developed in the case 50.

It has been found that for certain dielectrics air and other gases may be absorbed by the dielectric and that the trapped gases will gradually disappear while under other conditions gases may be generated. In order to overcome this difficulty and stabilize conditions, an annular gas filled container such as illustrated at 59 may be provided.

When a protective device with an annular chamber 59 is subjected to an arcing operation and gases are generated, the pressures will collapse the container and in the process of collapsing the container, the shock of the fusing or the generation of gases will be cushioned. Containers may be designed which will collapse when subjected to predetermined pressures and will remain in that condition or regain substantially their original shape when the pressure has been relieved. Any suitable bellows material could be employed as the collapsible container and it would regain its shape when the pressure was relieved.

The two modifications of the protective device illustrated in Figs. 11 and 12 are more or less diagrammatic. It will be readily appreciated that many different structures which will function in the same manner as the devices illustrated may be made.

Since certain changes may be made in the above article and different embodiments of the invention could be made without departing from the scope thereof, it is intended that all matter contained in the above description or shown in the accompanying drawings shall be interpreted as illustrative and not in a limiting sense.

I claim as my invention:

1. In a protective link for electrical apparatus provided with a body of dielectric, in combination, a conductor which will fuse when subjected to predetermined electrical conditions, the conductor being connected in circuit relation with the electrical apparatus, a case for the fusible conductor, the case being so disposed that at least a portion of the fusible conductor is immersed in the body of dielectric, said dielectric being subject to decomposition generating gases when exposed to an electric arc and a tube carried by the fusible conductor, said tube cooperating to predetermine the conditions at which the fusible conductor will fuse and a cap carried by the case disposed to be acted upon by the pressures generated to effect the separation of the fused portions of the conductor and to utilize the body of the dielectric to prevent arcing.

2. In a protective link for electrical apparatus provided with a body of dielectric, in combination, a conductor, which will fuse when subjected to predetermined electrical conditions, a case for the conductor, the case being so disposed that at least a portion of the fusible conductor is immersed in the body of dielectric, the dielectric being subject to decomposition producing gases when exposed to an electric arc, a tube carried by the fusible conductor cooperating to predetermine the conditions under which the fusible conductor will fuse, a cap carried by the lower end of the case and connected to the fusible conductor, the cap thereby being exposed to the pressure developed when gases are generated, whereby it may be projected from the case into the body of dielectric to effect a separation of the fused portions of the fusible conductor and to cooperate in the extinguishing of the arc.

3. In a protective link for electrical apparatus provided with a body of dielectric, in combination, a conductor which will fuse when subjected to predetermined electrical conditions, a tubular case for the conductor, the case being so disposed that at least a portion of the fusible conductor is immersed in the body of dielectric, the dielectric being subject to decomposition generating gases when exposed to an electric arc, a tubular case having an orifice therein to permit the escape of gases and dielectric to cooperate in regulating the pressures developed, means provided in the tubular case cooperative to effect a cushioning of the shock resulting from the fusing of the fusible conductor, a tube disposed on the fusible conductor to cooperate in predetermining the conditions under which the fusible conductor will fuse, a cap carried by the tubular case and connected to the fusible conductor, the cap thereby being exposed to the pressures generated in the tubular case, whereby when predetermined pressures are generated it is projected from the case through the body of dielectric to effect a separation of the fused portions of the fusible conductor to cooperate in the extinguishing of the arc.

4. In a protective device for electrical apparatus provided with a body of dielectric, in combination, a conductor which will fuse when subjected to predetermined electrical conditions, the conductor being connected in circuit relation with the electrical apparatus, a case for the fusible conductor, the case being so disposed that at least a portion of the fusible conductor is immersed in the body of dielectric, said dielectric being subject to decomposition generating gases when exposed to an electric arc, and an electrode connected in circuit relation with the fusible conductor and disposed out of alignment with the case, thereby to move the electrode through the body of dielectric to cause a loop in an arc struck to the electrode to cooperate in the interruption of the arc.

5. In a protective link for electrical apparatus, in combination, a conductor which will fuse when subjected to predetermined electrical conditions, a tubular case for the fusible conductor, a conductor connected in circuit relation with the fusible conductor, said conductor being so disposed in the tubular case that it may be pressed into a smaller space, a plunger associated with the conductor and movably mounted in the tubular case, and a volume of gas trapped in the tubular case above the plunger, the plunger when actuated upon the occurrence of an arc operating to compress the volume of gas trapped in the tubular case to cushion the shock resulting from the arcing.

6. In a protective link for use with electrical apparatus provided with a body of dielectric, in combination, a conductor which will fuse when subjected to predetermined electrical conditions, a case for the fusible conductor, a member carried by the case and attached to one end of the fusible conductor, means connected to the other end of the fusible conductor and disposed to cushion shock resulting from the development of pressures in the case, said member being disposed to be projected through the body of dielectric when predetermined pressures are developed in the case and the fusible conductor has been severed by fusing thereby to cooperate in the quick separation of the fused portions of the fusible conductor and to cause a turbulence in the body of the dielectric to effect a quenching of an arc caused by the fusing of the fusible conductor.

7. In a protective link for use with electrical apparatus provided with a body of dielectric, in combination, a conductor which will fuse when subjected to predetermined electrical conditions, a case for the fusible conductor, a plunger disposed in the case connected to one end of the fusible conductor, a member carried by the case attached to the other end of the fusible conductor, the case being suspended in the body of the dielectric to immerse a least a portion of the fusible conductor, the case being adapted to permit the entry of the dielectric, said member carried by the case being disposed to be projected through the body of the dielectric when predetermined pressures are developed in the case between the plunger and said member, the plunger being disposed to be projected in the opposite direction in the case thereby to effect a rapid separation of the fused portions of the fusible conductor under predetermined electrical conditions, the member when projected through the body of the dielectric causing a turbulence in the body of the dielectric to cooperate in extinguishing any arc that may be drawn during the fusing of the fusible conductor.

8. In a protective link for use with electrical apparatus provided with a body of dielectric, in combination, a conductor which will fuse when subjected to predetermined electrical conditions, a case for the conductor, a member carried by the case connected to one end of the fusible conductor, means disposed in the case for cushioning sudden pressures which may be developed upon the fusing of the fusible conductor, the case being suspended in the body of the dielectric to immerse at least a portion of the fusible conductor whereby when a fusing of the fusible conductor occurs the dielectric will be decomposed, generating gases, and a tube disposed on the fusible conductor, said tube being cooperative to predetermine the conditions under which the fusible conductor will fuse, the member attached to the end of the fusible conductor being disposed to be projected through the body of the dielectric upon the development of predetermined pressures, causing a turbulence in the dielectric and effecting a separation of the fused portions of the fusible conductor to cooperate in extinguishing an arc drawn upon the fusing of the fusible conductor.

9. In a protective link for electrical apparatus provided with a body of dielectric, in combination, a case, a fusible conductor disposed in the case, means for suspending the case and fusible conductor in the body of dielectric, means disposed in the case cooperative to cushion shocks resulting from the sudden generation of pressures in the case, a projectile connected to the lower end of the fusible conductor and disposed to be projected through the body of the dielectric upon the generation of pressures in the case, means connected to the projectile cooperative therewith to utilize effectively the force of the pressures to project it through the body of the dielectric, and a tube disposed on the fusible conductor to predetermine the electrical conditions under which it will fuse.

10. A protective link for electrical apparatus comprising, in combination, a conductor which will fuse when subjected to predetermined conditions, a body of dielectric in which a portion of the fusible conductor is immersed, a coiled conductor connected in circuit relation with the fusible conductor, a case for the coiled conductor, said conductor being so disposed in the tubular case that it may be pressed into a small space to cooperate in the separation of the fused portions of the fusible conductor, the coiled conductor cooperating in cushioning the shock resulting from the fusing of the fusible conductor, said coiled conductor being substantially non-resilient, whereby it does not tend to project the fused portions of the fusible conductor toward one another.

11. In a protective link for electrical apparatus provided with electrical coils and a dielectric for the coils, in combination, a conductor which will fuse when subjected to predetermined electrical conditions connected in circuit relation with the electrical coils, a tubular case for the fusible conductor, the tubular case being so disposed that the portion of the fusible conductor subject to fusing is immersed in the body of the dielectric which cooperates in predetermining the conditions under which the fusible conductor will fuse, the dielectric being subject to decomposition producing gases when subjected to an electric arc resulting from the fusing of the fusible conductor, a tube disposed on the portion of the fusible conductor immersed in the body of the dielectric cooperative to predetermine the conditions under which said fusible conductor will fuse, a cap carried by the lower end of the tubular case, the cap thereby being exposed to pressure resulting from the decomposition of the dielectric during the fusing of the fusible conductor, the fusible conductor having one end supported by the cap, whereby when the cap is projected off the end of the tubular case under pressure it cooperates in the separation of the fused portions of the fusible conductor and draws the fused portion of the fusible conductor through the body of the dielectric to utilize the dielectric to cooperate in quenching the arc.

12. In a protective link for electrical apparatus provided with electrical coils and a body of dielectric, in combination, a conductor which will fuse when subjected to predetermined electrical conditions connected in series circuit relation with said electrical coil, a case for the fusible conductor, the case being so disposed that the portion of the fusible conductor subject to fusing is immersed in the body of the dielectric which cooperates in predetermining the conditions under which the fusible conductor will fuse, a tube disposed on a portion of the fusible conductor immersed in the body of the dielectric to cooperate in predetermining the conditions under which the fusible conductor will fuse, a cap disposed over the lower end of the case, the cap being connected to the fusible conductor and having an opening therethrough for permitting the entry of the dielectric into the case, the dielectric being subject to decomposition producing gases when exposed to an arc resulting from the fusing of the fusible conductor, the cap thereby being exposed to the pressure of the gases resulting from the decomposition of the dielectric whereby it may be projected off the end of the case, the cap thereby cooperating in the separation of the fused portions of the fusible conductor and the extinguishing of the arc in the body of the dielectric.

13. In a protective device for electrical apparatus provided with electrical coils and a body of dielectric in which the coils are immersed, in combination, a fusible conductor connected in circuit relation with the coils, a case for the fusible conductor, the case being so disposed that the portion of the fusible conductor subject to fusing is immersed in the body of the dielectric which cooperates in predetermining the conditions under which it will fuse, a tube disposed on the fusible conductor cooperative with the dielectric to predetermine the conditions under which the fusible conductor will fuse, the dielectric being subject to decomposition generating gases when exposed to an electric arc, means carried by the case disposed to be subject to the pressure of the gases generated upon the fusing of the fusible conductor, whereby said means is projected into the body of the dielectric under pressure, and resilient means associated with the case cooperative to absorb the reactive forces resulting from the generation of gases and the separation of the fused portions of the fusible conductor.

MERRILL G. LEONARD.